United States Patent

Ong et al.

(10) Patent No.: US 9,281,853 B2
(45) Date of Patent: Mar. 8, 2016

(54) INTEGRATED CIRCUIT FOR COMMUNICATION

(71) Applicant: MediaTek Singapore Pte. Ltd., Singapore (SG)

(72) Inventors: Beng-Hwee Ong, Singapore (SG); Ee-Sze Khoo, Singapore (SG); Osama K A Shana'a, Singapore (SG)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 50 days.

(21) Appl. No.: 14/271,526

(22) Filed: May 7, 2014

(65) Prior Publication Data

US 2015/0056939 A1    Feb. 26, 2015

Related U.S. Application Data

(60) Provisional application No. 61/868,673, filed on Aug. 22, 2013.

(51) Int. Cl.
H04B 1/10    (2006.01)

(52) U.S. Cl.
CPC .............. *H04B 1/109* (2013.01); *H04B 1/1027* (2013.01); *H04B 1/1036* (2013.01)

(58) Field of Classification Search
CPC .......... H04B 1/06; H04B 1/10; H04B 1/1027; H04B 1/1036; H04B 1/109; H03G 3/00; H03G 3/24
USPC ............. 455/130, 226.1, 226.2, 232.1, 245.1, 455/250.1, 296, 305, 307, 311, 334
See application file for complete search history.

(56) References Cited

U.S. PATENT DOCUMENTS

| | | | |
|---|---|---|---|
| 4,338,582 A | 7/1982 | Presser | |
| 6,501,363 B1 * | 12/2002 | Hwu et al. | 336/200 |
| 6,922,108 B2 | 7/2005 | Lin | |
| 7,965,157 B2 | 6/2011 | Xu et al. | |
| 8,008,992 B2 * | 8/2011 | Chen et al. | 333/177 |
| 8,229,367 B2 | 7/2012 | Chan et al. | |
| 2003/0124999 A1 * | 7/2003 | Parssinen et al. | 455/226.1 |
| 2004/0066252 A1 * | 4/2004 | Chominski | 333/118 |
| 2007/0120622 A1 * | 5/2007 | Ezzeddine | 333/131 |
| 2008/0175307 A1 * | 7/2008 | Brunn et al. | 375/148 |

(Continued)

OTHER PUBLICATIONS

J.-S. Hong: "Couplings of Asynchronously Tuned Coupled Microwave Resonators"; IEE Proc.-Microw, Antennas Propag., vol. 147. No. 5, Oct. 2000; pp. 354-358.

*Primary Examiner* — Duc M Nguyen
(74) *Attorney, Agent, or Firm* — McClure, Qualey & Rodack, LLP (57) ABSTRACT

The present invention provides an integrated circuit for communication, e.g., for mobile radio-frequency (RF) telecommunication, including a resonator, a main amplifier, a matching circuit, a blocker detector, a mixer circuit, and a translation filter. The resonator provides conversion from single-end to differential, and filtering function for rejecting blockers at harmonics of local oscillation signal. The blocker detector detects occurrence of blocker; according to whether blocker exists, the main amplifier amplifies differential signal of the resonator by different gains, and the mixer circuit mixes amplified signal with different numbers of mixers. The translation filter contributes to rejection of blockers closed to in-band by providing a first pass band which is translated to a second pass band by the mixer circuit. The matching circuit provides impedance match.

18 Claims, 9 Drawing Sheets

(56) References Cited

U.S. PATENT DOCUMENTS

| | | | |
|---|---|---|---|
| 2008/0181337 A1* | 7/2008 | Maxim | 375/340 |
| 2010/0067422 A1 | 3/2010 | Kadous et al. | |
| 2010/0184371 A1 | 7/2010 | Cook et al. | |
| 2011/0127848 A1 | 6/2011 | Ryu et al. | |
| 2011/0299576 A1* | 12/2011 | Mikhemar et al. | 375/219 |
| 2011/0299632 A1* | 12/2011 | Mirzaei et al. | 375/340 |
| 2013/0029613 A1* | 1/2013 | Haralabidis et al. | 455/75 |
| 2013/0154674 A1* | 6/2013 | Nagpal | 324/715 |
| 2014/0361849 A1* | 12/2014 | Maxim et al. | 333/132 |
| 2014/0361856 A1* | 12/2014 | Leipold et al. | 333/24 C |

* cited by examiner

INTEGRATED CIRCUIT FOR COMMUNICATION

This application claims the benefit of U.S. provisional application No. 61/868,673, filed Aug. 22, 2013, the subject matter of which is incorporated herein by reference.

FIELD OF THE INVENTION

The present invention relates to integrated circuit (IC) for communication, and more particularly, to IC which can properly function with minimum external support circuitry to reduce overall cost, and can effectively suppressing interfering blockers.

BACKGROUND OF THE INVENTION

Wireless communication, e.g., mobile radio-frequency (RF) telecommunication, positioning and/or networking, has becomes an essential portion of contemporary information society. Wireless communication is implemented by associated wireless device, e.g., mobile phone, cellular phone or portable computer, compliant to specification (standards and/or protocols) of the wireless communication. Hence, how to reduce design, assembling and/or manufacturing effort and cost of wireless device, as well as how to enhance performance of wireless device, have become key challenges for modern electrical engineering.

To accomplish successful wireless communication, wireless device is expected to receive faint wanted wireless signal correctly (e.g., below a given block error rate, BLER) against interference of unwanted wireless signal, e.g., a strong continuous-wave (CW) blocking signal also referred to as blocker, which presents near frequency band (in-band) allocated to the wanted wireless signal. Specification of modern wireless communication includes stringent blocking standards to be followed by compliant wireless device. For example, FIG. 1 and FIG. 2 respectively illustrate two blocking standards for low-band EDGE MCS 4 GSM 850 and high-band PCS developed by ETSI, wherein GSM, EDGE, MCS, PCS and ETSI respectively are abbreviations of "global system for mobile communication," "enhanced data rates for GSM evolution," "modulation and coding scheme," "personal communication service" and "European telecommunications standards institute."

Figure 1:
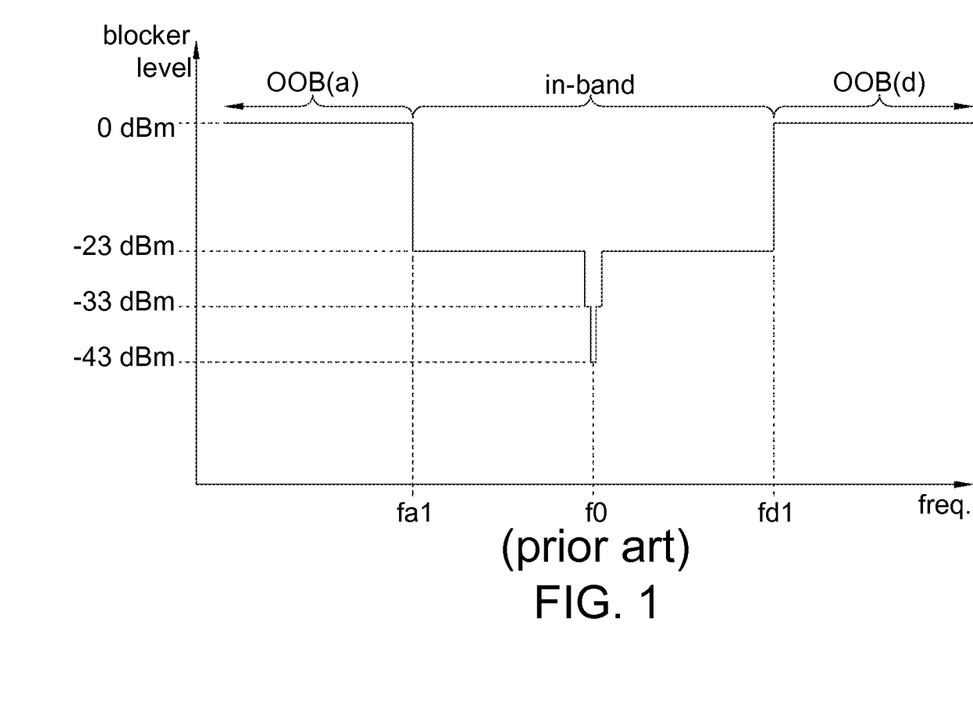
FIG. 1 and FIG. 2 (prior art) illustrate examples of blocking standards.

As shown in FIG. 1, the frequency domain is divided to an in-band portion between frequencies fa1 and fd1 (e.g., 849 and 914 MHz) allocated for wanted wireless signal, an out-of-band (OOB) portion OOB(a) below the frequency fa1 (to about 200 MHz) and an OOB portion OOB(d) above the frequency fd1 (to about 12.75 GHz). The blocking standard shown in FIG. 1 demands a compliant wireless device to receive a wanted wireless signal of −99 dBm at a frequency f0 of the in-band portion with BLER below 10% when an unwanted blocker of 0 dBm presents at a frequency of the portions OOB(a) and OOB(d).

Figure 2:
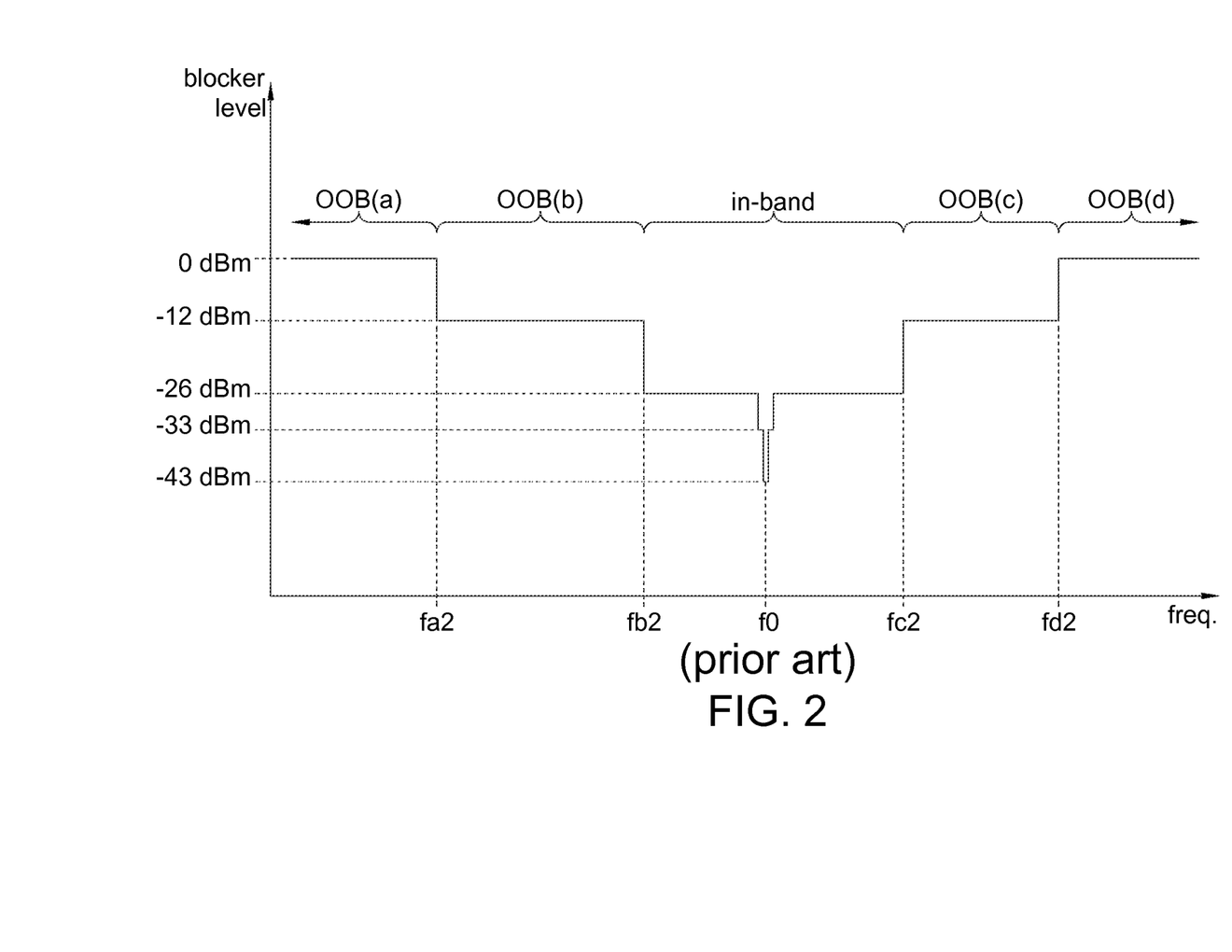

In the example of FIG. 2, the frequency domain is divided to an in-band portion and four OOB portions OOB(a) to OOB(d). The portion OOB(a) is below a frequency fa2 (e.g., 1830 MHz), the portion OOB(b) is between the frequency fa2 and a frequency fb2 (e.g., 1910 MHz), the in-band portion is between the frequency fb2 and a frequency fc2 (e.g., 2010 MHz), the portion OOB(c) is between the frequency fc2 and a frequency fd2 (e.g., 2070 MHz), and the portion OOB(d) is above the frequency fd2. For a wireless device to be compliant with the blocking standard shown in FIG. 2, a wanted in-band wireless signal of −99 dBm is expected to be received with BLER below 10% when an unwanted blocker of 0 dBm presents at a frequency of the portions OOB(a) and OOB(d), and/or an unwanted blocker of −12 dBm presents at a frequency of the portions OOB(b) and OOB(c).

From the examples of FIG. 1 and FIG. 2, it is noted that OOB portions (i.e., the portions OOB(a) and/to OOB(d)) cover a broad range of the whole frequency axis, and OOB blocker can present at any frequency in the OOB portions. That is, a compliant wireless device is demanded to reject blockers at a wide variety of frequencies.

Conventionally, the rather challenging blocking standard is overcome by adopting an external, bulky but expensive SAW (surface acoustic wave) filter, or by adopting a highly linear differential receiver which requires a cooperative external BALUN. Although off-chip SAW filter(s) or BALUN(s) may contribute to suppression of blockers, both incur extra costs. Furthermore, to implement the external SAW filter and/or BALUN, extra impedance matching components (networks) are needed, which also add on the overall cost. In addition, system designer of wireless device needs more design effort, know-how and experience to properly place and route the external SAW filter(s) and/or BALUN(s) along with the accompanying impedance matching components on circuit board, e.g., printed circuit board (PCB). Even with fully devoted effort, the resultant PCB placement and routing are sensitive to variations, and lack flexibility and/or reusability to be generally adopted by different types of devices.

Figure 3:
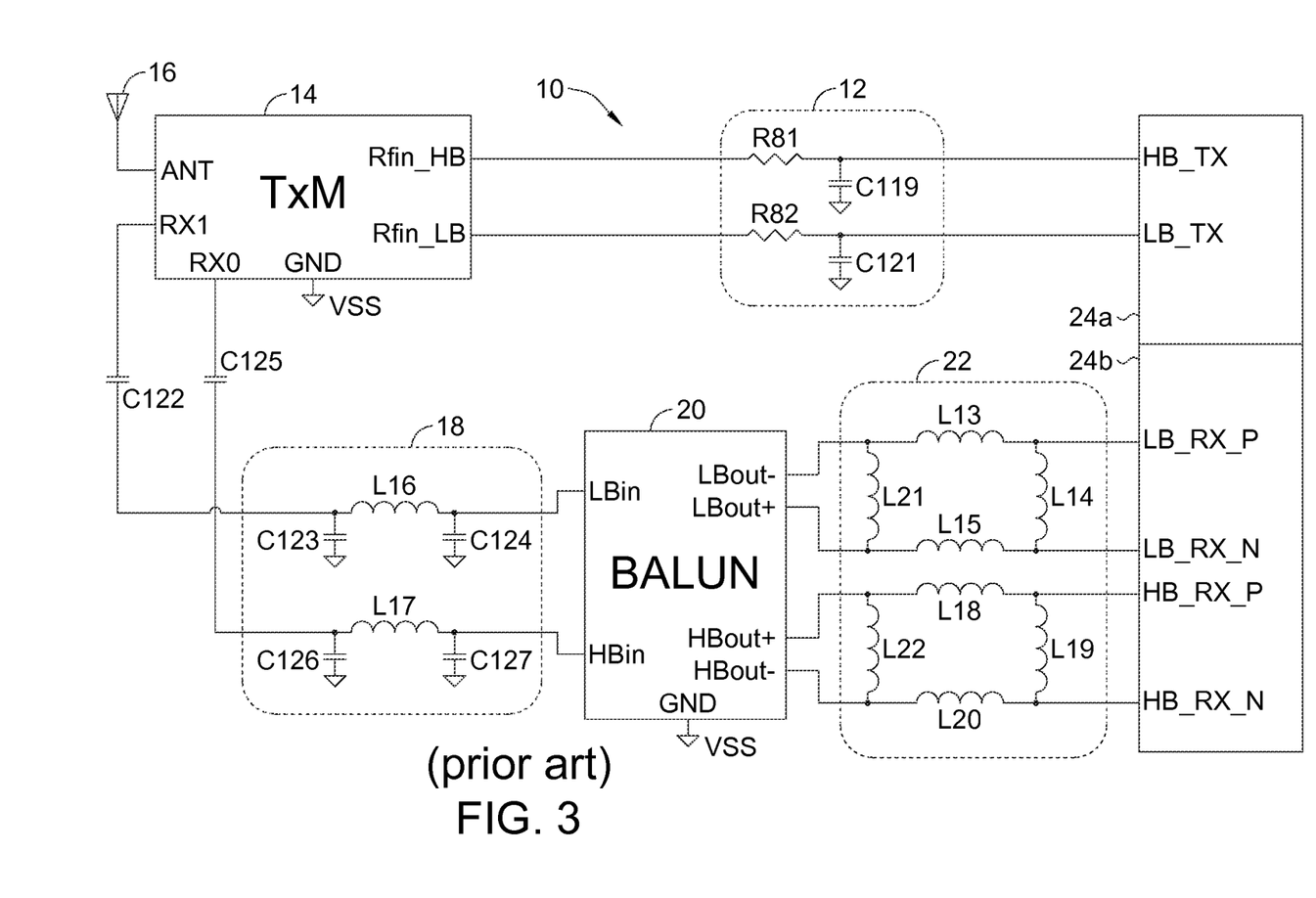
FIG. 3 (prior art) illustrates a prior art interface between antenna, transmitter and receiver.

Please refer to FIG. 3 illustrating a conventional wireless interface (platform) 10 for a wireless device. The interface 10 bridges an antenna 16 to a transmitter 24a and a receiver 24b, and includes a transmit module (a packaged IC) 14, an external BALUN (another packaged IC) 20, off-chip capacitors C122 and C125, and networks 12, 18 and 22. The network 12 includes off-chip resistors R81 and R82, and capacitors C119 and C121. The network 18 includes off-chip capacitors 123, 124, 126 and 127, along with inductors L16 and L17. The network 22 includes off-chip inductors L13 to L15 and L18 to L22. The off-chip capacitors, inductors and resistors of the networks 12, 18, and 22, as well as the transmit module 14, BALUN 20 and the capacitors C122 and C125, are collectively mounted on a circuit board (e.g., PCB, not shown) of the wireless device.

The transmit module (TxM) 14 includes an antenna switching module (ASM, not shown), so a terminal ANT electrically coupled to the antenna 16 can be selectively conducted to one of terminals Rfin_HB, Rfin_LB, RX0 and RX1. High-band RF signal and low-band RF signal to be transmitted via the antenna 16 are provided by the transmitter 24a respectively via terminals HB_TX and LB_TX, relayed to the terminals Rfin_HB and Rfin_LB via the network 12, and further relayed to the antenna 16 via the TxM 14.

On the other hand, high-band wireless RF signal and low-band wireless RF signal received via the antenna 16 are respectively dispatched to the terminals RX0 and RX1, and relayed to terminals HBin and LBin of the BALUN 20 as two single-end signals via the capacitors C125, C122 and the network 18, which serves as an ASM matching network. The BALUN 20 can convert the single-end signal at the terminal LBin to a differential signal between terminals LBout+ and LBout−, and convert the single-end signal at the terminal HBin to another differential signal between terminals HBout+ and HBout−. Further via the network 22 which serves as a receiver differential matching network, the two differential signals between the terminals LBout− and LBout+ as well as the terminals HBout+ and HBout− are respectively relayed to terminals LB_RX_P, LB_RX_N, HB_RX_P and HB_RX_N to be received by the receiver 24b.

According to FIG. 3, it is noted that the external BALUN 20 needs fourteen components (inductors and capacitors) to implement the network 22 between the BALUN 20 and the receiver 24b, and the network 18 between the BALUN 20 and the TxM 14.

SUMMARY OF THE INVENTION

To address issues of prior arts, the present invention provides an integrated circuit which achieves easy deployment, effective cost reduction, compact PCB area and OOB blocking compliance with fully embedded (on-chip) impedance matching circuitry and single-end to differential conversion circuitry.

According to the invention, blockers happened in the wide frequency range of OOB portions can be categorized to close-in blockers and far-out blockers. Close-in blockers distribute in a frequency range extending outward from upper and lower frequency bounds of the in-band portion by a frequency offset of several tens of MHz, e.g., 20 MHz for low-band and 80 MHz for high-band. Blockers other than close-in blockers can be referred to as far-out blockers, including blockers at harmonics of local oscillation frequency.

An objective of the invention is providing an IC for RF wireless communication, including a receiver terminal, a built-in multi-mode resonator, a main amplifier (e.g., a low-noise amplifier, LNA), an embedded matching circuit, a mixer circuit, a translation filter and a blocker detector. The receiver terminal is capable of receiving a single-end RF signal from an antenna. The resonator is electrically coupled between the receiver terminal and an internal port, and is capable of providing a conversion from single-end signal at the receiver terminal to differential signal at the internal port, and also capable of providing a filtering function to reject far-out blockers, such as blockers related to harmonics of local oscillation; that is, filtering function of the resonator is associated with a harmonic of an oscillation signal of the mixer circuit.

In an embodiment, the resonator includes a first coil, a second coil, a first cross capacitor, a second cross capacitor, a front capacitor and a back capacitor. The first coil has a first end and a second end electrically coupled to the receiver terminal and a supply voltage (e.g., ground voltage) respectively. The second coil is magnetically coupled to the first coil, and has a third end and a forth end electrically coupled to two nodes of the internal port respectively. The first cross capacitor is connected between the first end and the third end, and the second cross capacitor is connected between the second end and the fourth end. The front capacitor is connected between the first end and the second end, and the back capacitor is connected between the third end and the fourth end. In an embodiment, one or more of the first cross capacitor, the second cross capacitor, the front capacitor and the back capacitor can be programmable. The magnetic coupling between the two coils contributes to conversion from single-end to differential, and the electric coupling between the two coils (e.g., formed by the first cross capacitor and the second cross capacitor) contributes to rejection of far-out blockers.

The blocker detector is electrically coupled to the internal port, capable of detecting occurrence of blocker.

The main amplifier is electrically coupled between the internal port and a high-frequency port, and is capable of amplifying a first signal at the internal port and accordingly providing a second signal at the high-frequency port. According to detection of the blocker detector, when blocker is not detected, the main amplifier is capable of operating in a normal mode to amplify the first signal by a first gain; on the other hand, when blocker is detected, the main amplifier is capable of operating in an OOB mode to amplify the first signal by a second gain which differs from the first gain. In an embodiment, the first gain for the normal mode is greater than the second gain for the OOB mode; i.e., the main amplifier drops gain during the OOB mode to prevent weak wanted in-band signal from being desensitized by strong OOB blockers.

The mixer circuit is electrically coupled between the high-frequency port and a low-frequency port, capable of mixing the second signal with the oscillation signal, i.e., local oscillation signal. In an embodiment, the mixer circuit includes a main mixer and an auxiliary mixer. In response to detected result of the blocker detector, when blocker is not detected, the mixer circuit is capable of operating in a normal mode to enable the main mixer and disable the auxiliary mixer; on the other hand, when blocker is detected, the mixer circuit is capable of operating in an OOB mode to enable both the main mixer and the auxiliary mixer. When both the main mixer and the auxiliary mixer are enabled, the mixer circuit can exploit more driving current and power to enhance performance of mixing, e.g., to achieve higher linearity and lower phase noise. In an embodiment, the auxiliary mixer is a duplicate of the main mixer.

The translation filter is electrically coupled to the low-frequency port, and is capable of providing a first pass band at the low-frequency port, and the mixer circuit is further capable of translating the first pass band to a second pass band at the high-frequency port, so as to reject close-in blockers at the high-frequency port. In an embodiment, frequency of the first pass band is lower than frequency of the second pass band, for example, the first pass band can be a low-pass band. In an embodiment, the translation filter includes a filter capacitor, a first resistor and a second resistor. The filter capacitor is electrically coupled between a first low-frequency node of the low-frequency port and a second low-frequency node of the low-frequency port. The first resistor is electrically coupled between the first low-frequency node and a first filter node. The second resistor is electrically coupled between the second low-frequency node and a second filter node. The integrated circuit of the invention can further include a low-pass filter electrically coupled to the first filter node and the second filter node.

The matching circuit is electrically coupled to the internal port, capable of providing impedance for a first internal node of the internal port and a second internal node of the internal port, and includes an auxiliary amplifier electrically coupled between the internal port and an auxiliary port, a first feedback impedance electrically coupled between the first internal node and a first auxiliary node of the auxiliary port, and a second feedback impedance electrically coupled between the second internal node and a second auxiliary node of the auxiliary port. The first feedback impedance and the second feedback impedance can be programmable.

In an embodiment, the main amplifier includes a first trans-conductance cell electrically coupled between the first internal node and a first high-frequency node of the high-frequency port, and a second trans-conductance cell electrically coupled between the second internal node and a second high-frequency node of the high-frequency port. In an embodiment, the first trans-conductance cell includes a first transistor having a gate and a drain electrically coupled to the first internal node and the first high-frequency node respectively. Symmetrically, the second trans-conductance cell includes a second transistor having a gate and a drain electrically coupled to the second internal node and the second high-frequency node respectively.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 4:
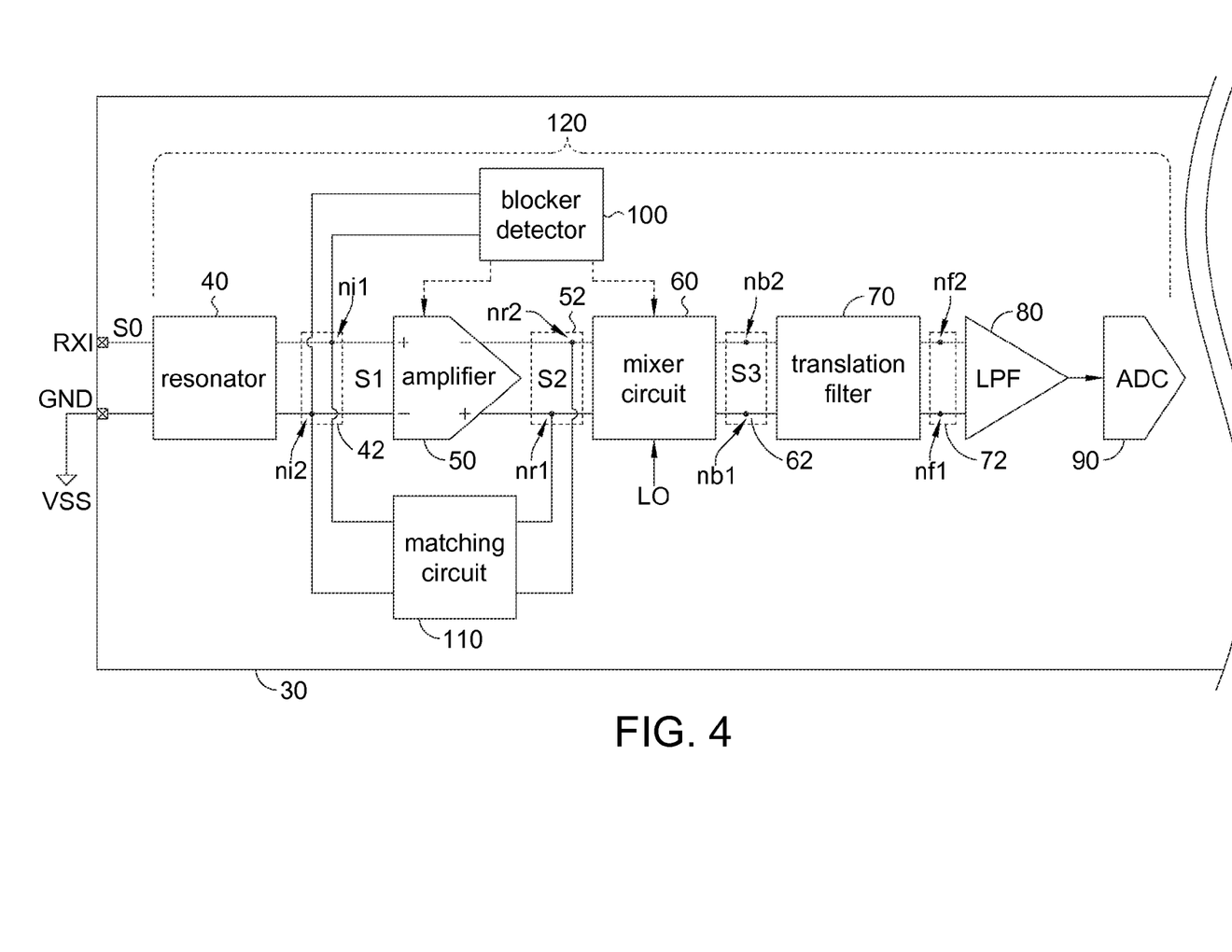
FIG. 4 illustrates an IC according to an embodiment of the invention.

Please refer to FIG. 4 illustrating an IC 30 according to an embodiment of the invention. The IC 30 can be a packaged die for RF wireless communication; for wireless signal receiving, the IC 30 includes a receiver circuit 120 with two terminals (pins) RXI and GND. The receiver circuit 120 includes an embedded resonator 40, an amplifier 50 (e.g., a current mode LNA), a mixer circuit 60, a translation filter 70, a low-pass filter (LPF) 80 and an analog to digital converter (ADC) 90, along with a blocker detector 100 and an embedded matching circuit 110.

The terminal GND is electrically coupled to a supply voltage VSS (e.g., a ground voltage). The terminal RXI (receiver terminal) is capable of receiving a single-end RF signal S0 from an antenna (not shown). For example, the terminal RXI can be a low-band receiver terminal for receiving a low-band signal S0 at about 850 MHz, and the receiver circuit 120 can therefore be a low-band receiver circuit configured for low-band receiving. The terminal RXI can also be a high-band receiver terminal for receiving a high-band signal S0 at about 1900 MHz; accordingly, the receiver circuit 120 is a high-band receiver circuit configured for high-band receiving.

The resonator 40 is electrically coupled between the terminal RXI and a port 42 (internal port) of two nodes ni1 and ni2, and is capable of providing a conversion from the single-end signal S0 at the terminal RXI to a differential signal S1 between the nodes ni1 and ni2 of the port 42. The resonator 40 is also capable of providing a filtering function to reject far-out blockers. Embodiment and operation principle of the resonator 40 will be discussed later via FIG. 6 and FIG. 7.

As shown in FIG. 4, the blocker detector 100 is electrically coupled to the port 42, capable of detecting presence of blockers. For example, the blocker detector 100 can include a rectifier (not shown) capable of converting a CW signal at the port 42 to a DC (direct current) term whose level can reflect amplitude of the CW signal, so the blocker detector 100 can determine whether blocker presents by checking level of the DC term, e.g., comparing if the DC term is greater than a blocker threshold.

The amplifier 50 (main amplifier) is electrically coupled between the port 42 and a port 52 (high-frequency port) of two nodes nr1 and nr2, and is capable of amplifying the signal S1 at the port 42 to accordingly provide an amplified differential signal S2 between the nodes nr1 and nr2 of the port 52. According to blocker detection result of the blocker detector 100, when blocker is not detected, the amplifier 50 is capable of operating in a normal mode to amplify the signal S1 to the signal S2 by a first gain; on the other hand, when blocker is detected, the amplifier 50 is capable of operating in an OOB mode to amplify the signal S1 to the signal S2 by a second gain which differs from the first gain. In an embodiment, the first gain for the normal mode is greater than the second gain for the OOB mode; i.e., the amplifier 50 drops gain during the OOB mode, so as to prevent weak wanted in-band signal from being desensitized by strong OOB blockers. Cooperation of the blocker detector 100 and the amplifier 50 can also establish an automatic gain control mechanism, which facilitates management of signal level to exploit full dynamic range of the ADC 90.

The mixer circuit 60 is electrically coupled between the port 52 and a port 62 (low-frequency port) of two nodes nb1 and nb2, and is capable of mixing the signal S2 with a local oscillation signal LO, so the signal S2 at the port 52 can be down-converted to a signal S3 at the port 62. In response to blocker detection result of the blocker detector 100, when blocker is not detected, the mixer circuit 60 is capable of operating in a normal mode to drain reduced power for mixing; on the other hand, when blocker is detected, the mixer circuit 60 is capable of operating in an OOB mode to exploit more power for mixing, so as to enhance performance of mixing, e.g., linearity and suppression of phase noise, and accordingly prevent blockers induced by mixing.

The translation filter 70 is electrically coupled between the port 62 and a port 72 of two nodes nf1 and nf2, and capable of providing a pass band B1 (later shown in FIG. 5). The mixer circuit 60 is further capable of performing bidirectional mixing to translate the pass band B1 at the port 62 to a pass band B2 (later shown in FIG. 5) at the port 52, by a frequency fLO of the signal LO. The band B1 of the translation filter 70 is so designed that the translated band B2 at the port 52 can be utilized to reject close-in blockers surrounding wanted in-band signal around the frequency fLO.

The LPF 80 is electrically coupled between the port 72 and the ADC 90 for low-pass filtering a signal at the port 72 and outputting the filtered signal to the ADC 90, so the ADC 90 can convert the analog filtered signal to a corresponding digital signal.

Figure 5:
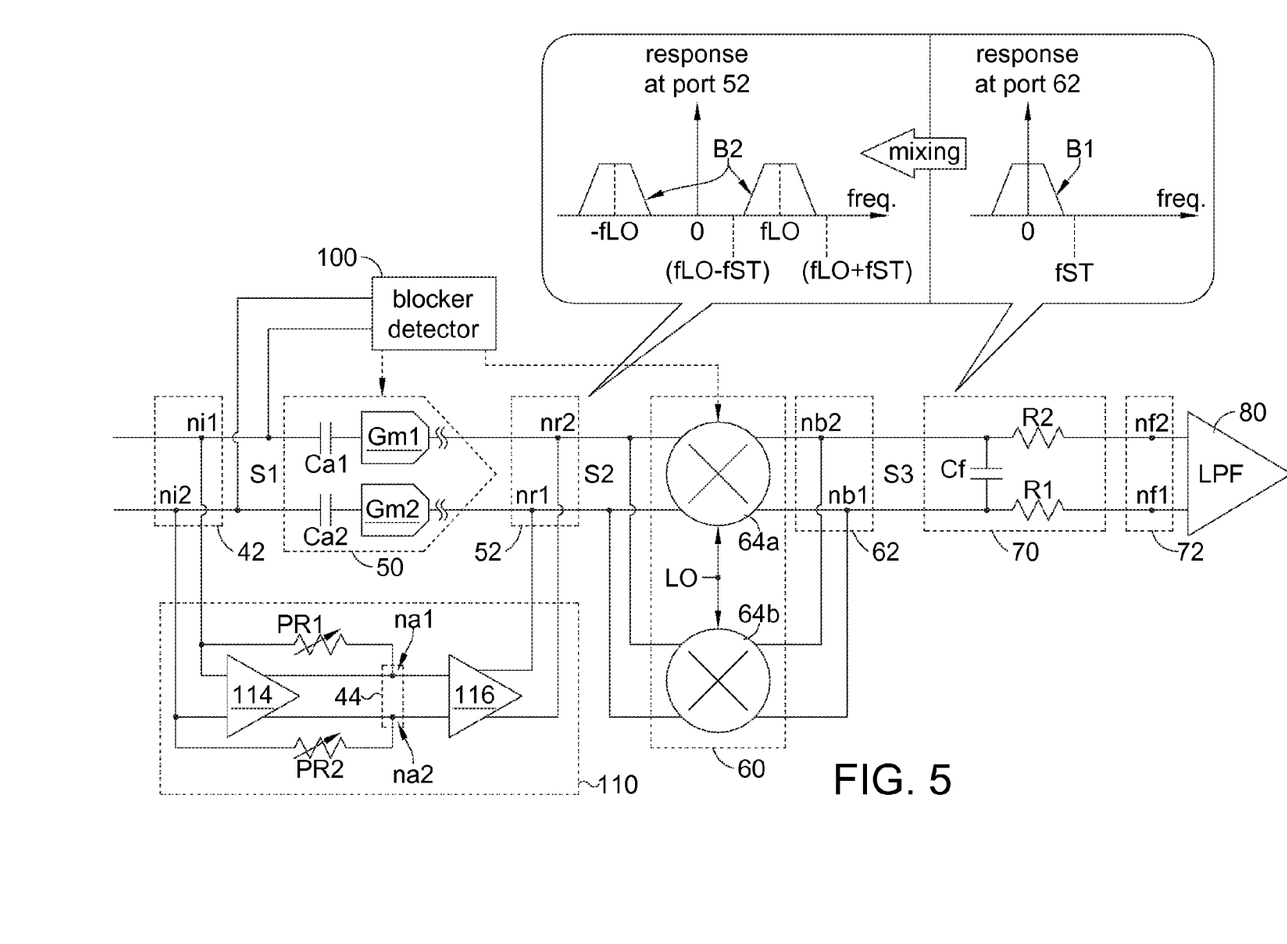
FIG. 5 illustrates an implementation example of the mixer circuit, the translation filter and the matching circuit shown in FIG. 4.

Along with FIG. 4, please refer to FIG. 5 illustrates an implementation embodiment of the amplifier 50, the mixer circuit 60 and the translation filter 70. As shown in FIG. 5, the amplifier 50 can include two capacitors Ca1 and Ca2, and two trans-conductance cells Gm1 and Gm2 forming an input stage capable of converting a voltage between the nodes ni1 and ni2 to currents at the nodes nr1 and nr2. The trans-conductance cell Gm1 is electrically coupled between the nodes ni1 (via the capacitor Ca1) and nr2, and the trans-conductance cell Gm2 is electrically coupled between the nodes ni2 (via the capacitor Ca2) and nr1.

In the embodiment of FIG. 5, the mixer circuit 60 includes two mixers 64a (main mixer) and 64b (auxiliary mixer). In an embodiment, the mixer 64b is a duplicate of the mixer 64a. During the normal mode when blocker is not detected by the blocker detector 100, the mixer circuit 60 keeps the mixer 64a enabled and the mixer 64b disabled, thus the mixer circuit 60 only consumes limited power for mixing the signal S2 with the signal LO. On the other hand, during the OOB mode when the blocker detector 100 reflects existence of blockers, the mixer circuit 60 enables both the mixers 64a and 64b, so the mixer circuit 60 can drain more driving current and power to suppress mixer induced blocker by enhancing performance of mixing, e.g., by achieving higher linearity and stronger suppression of phase noise. In an embodiment, the mixers 64a and 64b are passive, and therefore bidirectional, mixers.

As shown in FIG. 5, an embodiment of the translation filter 70 includes a capacitor Cf (filter capacitor) and two resistors R1 and R2 (first and second resistors). The capacitor Cf is electrically coupled between the nodes nb1 and nb1 of the port 62. The resistor R1 is electrically coupled between the nodes nb1 and nf1. The resistor R2 is electrically coupled between the nodes nb2 and nf2. In an embodiment, the resistors R1 and R2 are matched to provide a same resistance, e.g., 80 Ohms. With the resistors R1 and R2 and the capacitor Cf, the translation filter 70 provides the band B1 (e.g., a low-pass band) at the port 62, which is up-converted, by the mixing circuit 60, to the band B2 (including a positive and a negative pass-band portions) at the port 52, so the band B2 can be utilized to reject close-in blockers. For example, at the port 62, the translation filter 70 can provide a low impedance at a frequency fST beyond the band B1; by the mixer circuit 60, and the low impedance at the frequency fST at the port 62 is transformed to a low impedance at a frequency (fLO+fST) or (fLO−fST) at the port 52, so AC current of blocker at the frequency (fLO+fST) or (fLO−fST) is equivalently shunt to ground to be suppressed before reaching the mixer circuit 60. That is, by properly choosing capacitance of the capacitor Cf and resistance of the resistors R1 and R2, bandwidth of the band B1 and therefore the band B2 can be designed to preserve wanted in-band signal around the frequency fLO, and to reject unwanted blockers at frequency close to in-band.

While the translation filter 70 can effectively suppress blockers at frequency close to and beyond frequency of wanted in-band signal, the translation filter 70 may fold far-out blockers at and around harmonics of the signal LO due to mixer nature. It is therefore essential to reject the far-out blockers at harmonics of the signal LO presented at the port 42 (and/or the port 52), so the far-out blockers are filtered out before they reach the entrance port 52 of the mixer circuit 60. To address issues of the far-out blockers, the resonator 40 adopts an on-chip (embedded) mixed mode structure. Along with FIG. 4, please refer to FIG. 6 and FIG. 7 respectively illustrating an implementation of the resonator 40 and associated exemplary characteristics of the implementation. The resonator 40 is arranged to filter the far-out blockers to an acceptable range where the succeeding stages (the amplifier 50, the mixer circuit 60, the translation filter 70 and/or the LPF 80) are able to handle. In addition, the resonator 40 also serves to provide conversion from single-end to differential, while such conversion is traditionally provided by external BALUN.

Figure 6:
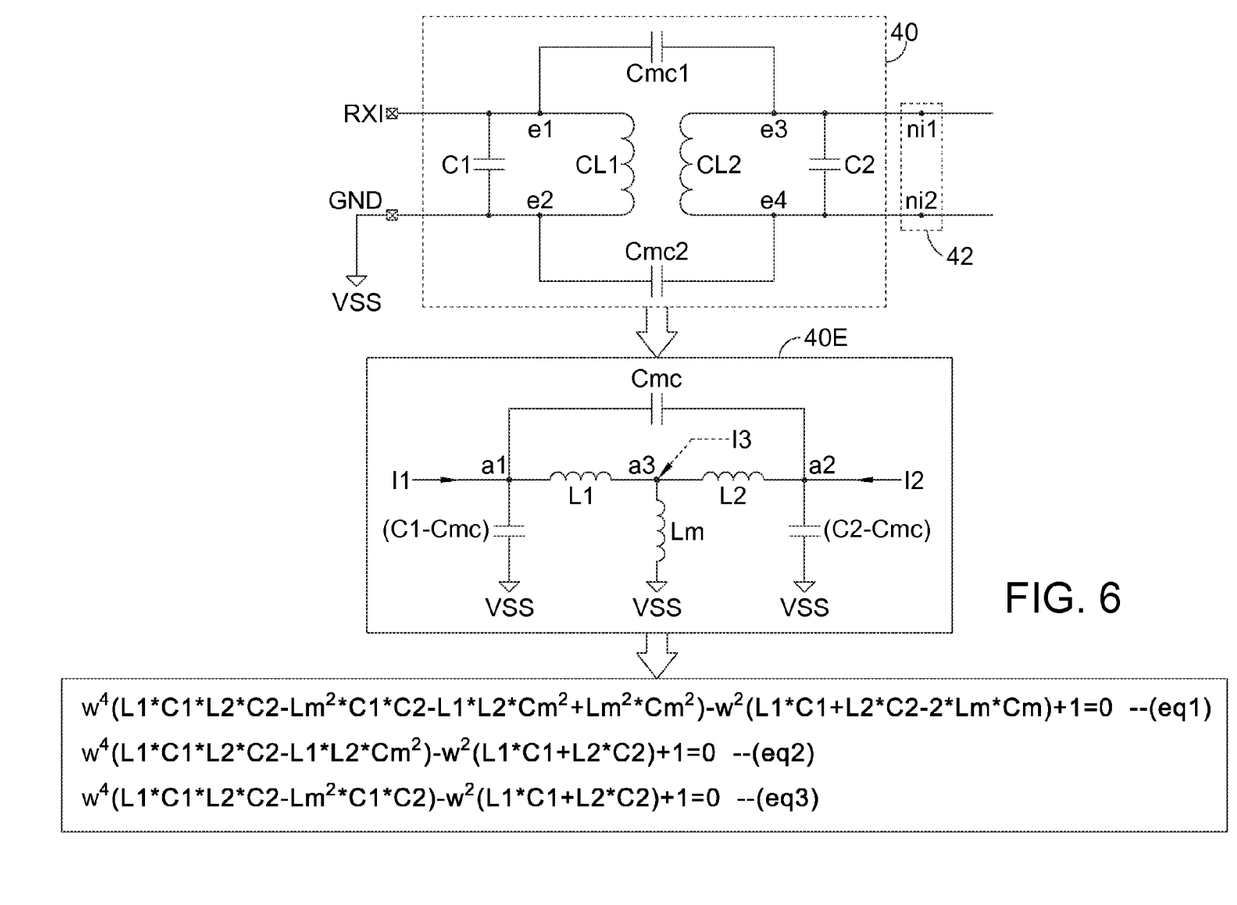
FIG. 6 illustrates an implementation example of the resonator shown in FIG. 4.

As shown in FIG. 6, the resonator 40 can includes two magnetically mutually coupled coils CL1 and CL2 (first and second coils), two capacitors Cmc1 and Cmc2 (first and second cross capacitors) and another two capacitors C1 and C2 (front and back capacitors). The coil CL1 has two ends e1 and e2 (first and second ends) electrically coupled to the terminals RXI and GND, so the end e2 is electrically coupled to the supply voltage VSS. The coil CL2 has two ends e3 and e4 (third and fourth ends) electrically coupled to the two nodes ni1 and ni2 of the port 42, respectively. The capacitor Cmc1 is connected between the ends e1 and e3, and the capacitor Cmc2 is connected between the ends e2 and e4. The capacitor C1 is connected between the ends e1 and e2, and the capacitor C2 is connected between the ends e3 and e4.

In an embodiment of the resonator 40, the capacitors Cmc1 and Cmc2 are matched, both provide a same capacitance Cmc. FIG. 6 also illustrates an equivalent circuit 40E of the resonator 40. The equivalent circuit 40E includes a capacitor of capacitance Cmc connected between nodes a1 and a2, a capacitor of capacitance (C1−Cmc) connected between the node a1 and the voltage VSS, a capacitor of capacitance (C2−Cmc) connected between the node a2 and the voltage VSS, an inductor L1 connected between the nodes a1 and a3, an inductor L2 connected between the nodes a2 and a3, and an inductor Lm connected between the node a3 and the voltage VSS, with currents I1, I2 and I3 respectively injected to the nodes a1, a2 and a3.

In the circuit 40E, the inductor Lm reflects magnetic coupling between the coils CL1 and CL2; the magnetic coupling between the two coils CL1 and CL2 contributes to conversion from single-end signal at the terminal RXI to differential signal at the port 42. The capacitance Cmc in the circuit 40E reflects electrical coupling between the coils CL1 and CL2 of the resonator 40; e.g., electrical coupling formed by the capacitors Cmc1 and Cmc2. The electrical coupling between the two coils CL1 and CL2 contributes to rejection of far-out blockers. The resonator 40 is therefore a mixed mode resonator, because it concurrently operates in both magnetic coupling and electrical coupling.

According to the circuit 40E, a resonance angular frequency w is derived to satisfy an equation eq1 listed in FIG. 6 (with Cm=Cmc). Using super-position principle, an electrical coupling resonance frequency can be calculated by solving the angular frequency w in an equation eq2, wherein the equation eq2 is obtained by setting the inductor Lm of the equation eq1 to zero. Similarly, a magnetic coupling resonance frequency can be calculated by solving the angular frequency w in an equation eq3, which is obtained by setting the capacitance Cm of the equation eq1 to zero. Accordingly, by properly choosing capacitances of the capacitors C1, C2, Cmc1 and Cmc2 as well as equivalent inductances of the coils CL1 and CL2, the resonator 40 can reject unwanted far-out OOB blockers at frequency estimated by the equation eq2 of electrical coupling, and perform single-end to differential conversion for wanted in-band signal at frequency estimated by the equation eq3 of magnetic coupling.

Figure 7:
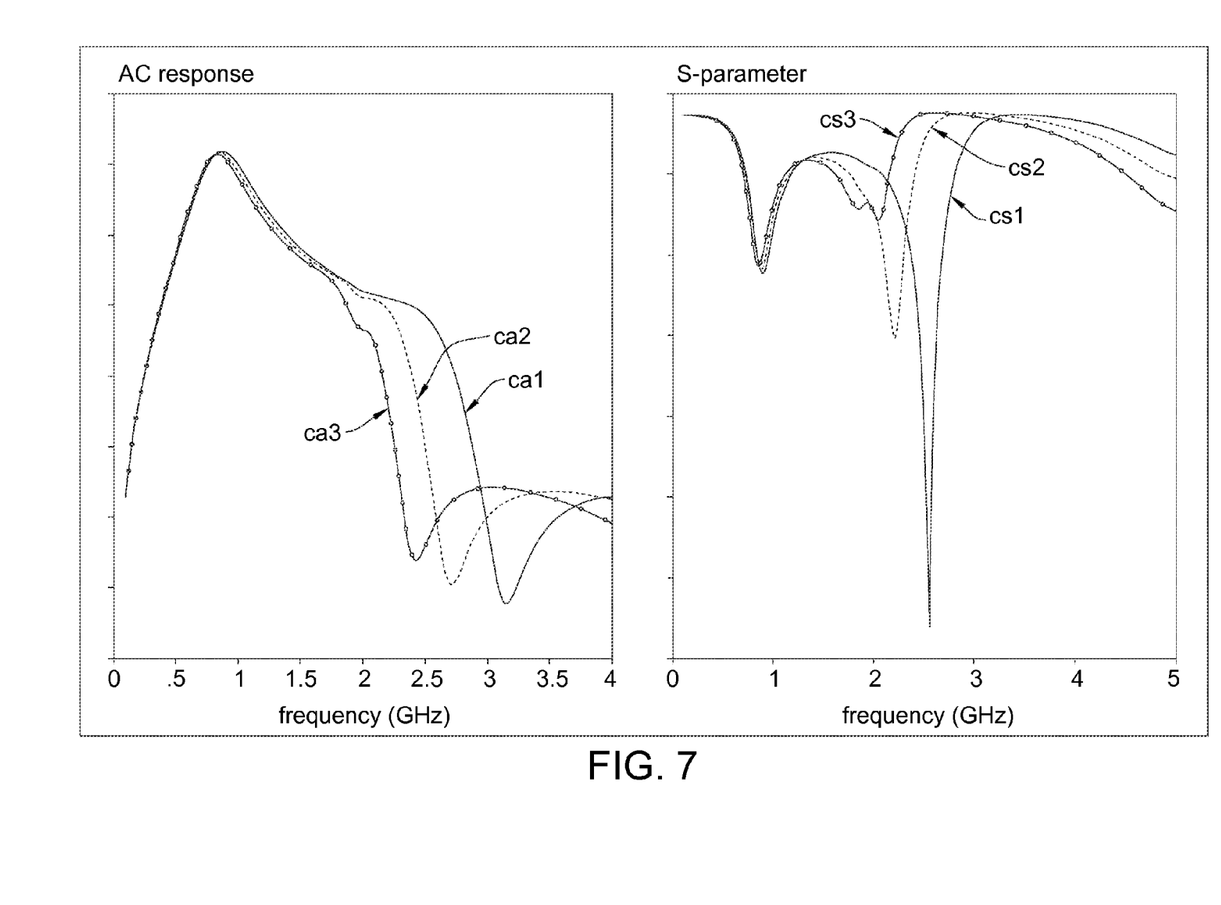
FIG. 7 illustrates examples of the characteristics of the resonator shown in FIG. 6.

In an embodiment, the capacitors Cmc1 and Cmc2 are programmable; for example, the capacitors Cmc1 and Cmc2 can be two duplicated programmable capacitors, both provide a same programmable capacitance. According to a design example for low-band communication at about 850 MHz, FIG. 7 illustrates AC response and S-parameter of the resonator 40. As the capacitance of the capacitors Cmc1 and Cmc2 increases, the AC response of the resonator 40 varies from a curve ca1 to a curve ca2 and then a curve ca3, and the S-parameter varies from a curve cs1 to a curve cs2 and a curve cs3. As shown in FIG. 7, the resonator 40 can have a high-frequency notch at around 2 to 3 GHz (depending on capacitance of the capacitors Cmc1 and Cmc2), and the notch is exploited to reject far-out blockers at harmonics of local oscillation frequency, so the far-out blockers can be filtered out before reaching the entrance port 42 of the amplifier 50. The resonator 40 also resonates at a resonator frequency (e.g., a low-band frequency around 950 MHz in the example of FIG. 7) to preserve and convert wanted in-band signal, while the resonator frequency is related to capacitance of the capacitors C1 and C2.

In an embodiment, not only the capacitors Cmc1 and Cmc2 are programmable, but the capacitors C1 and C2 can also be programmable. Programmability of the capacitors Cmc1 and Cmc2 can be leveraged to tune and/or calibrate notch behavior (e.g., frequency range and center of notch) in characteristics (e.g., AC response and/or S-parameter) of the resonator 40, but can also be optional; i.e., the capacitors Cmc1 and Cmc2 can have constant capacitance, since characteristics of the resonator 40 are usually robust against variation of capacitance and inductance. Programmability of the capacitors C1 and/or C2 can be utilized to tune (center) resonance of the resonator 40 (e.g., the resonator frequency), but can also be optional.

Figure 8:
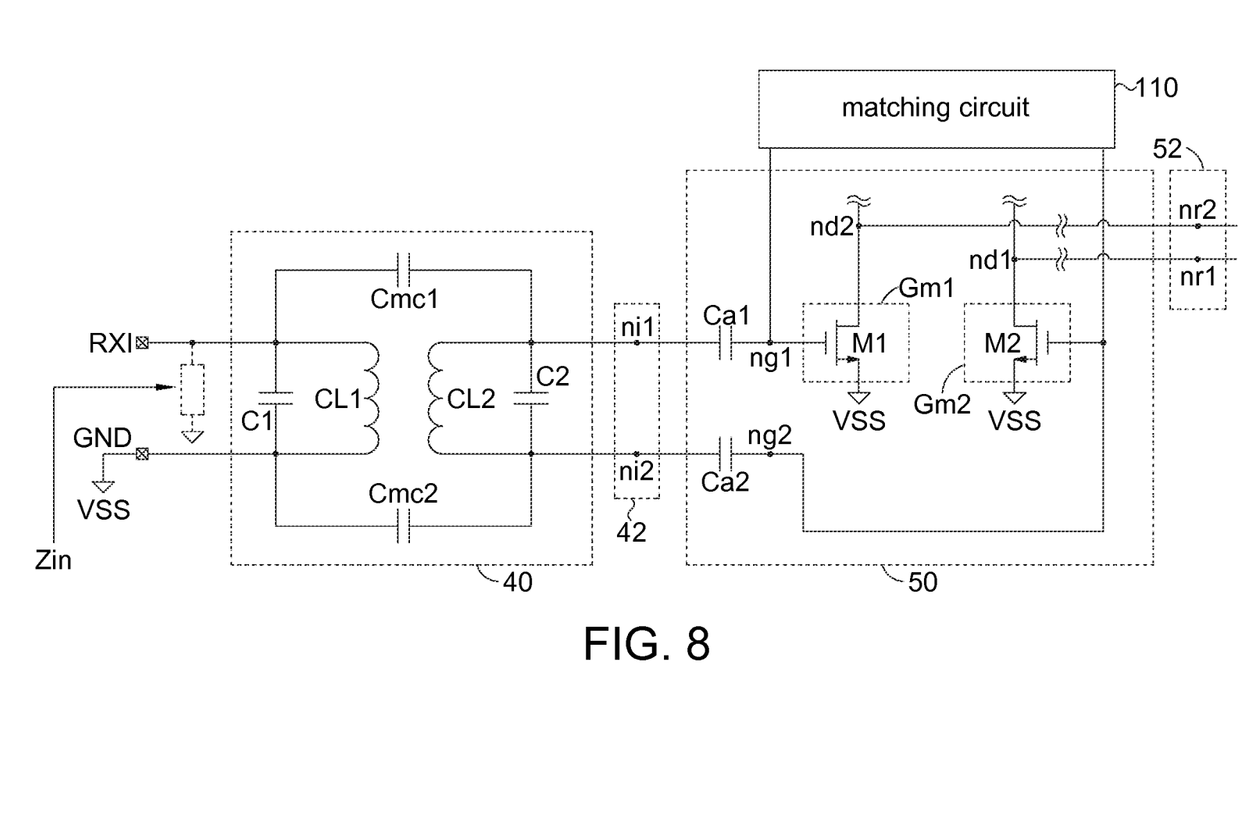
FIG. 8 illustrates an implementation example of the amplifier shown in FIG. 4.

Please refer back to FIG. 4. To further eliminate required external matching networks off the integrated circuit 30, the matching circuit 110, e.g., an active matching circuit, is arranged to provide a real part matching for the terminal RXI. As shown in the example of FIG. 5, the matching circuit 110 can include an amplifier 114 (auxiliary amplifier) electrically coupled between the port 42 and a port 44 (auxiliary port) of two node na1 and na2, an impedance PR1 (first feedback impedance) electrically coupled between the nodes ni1 and na1, an impedance PR2 (second feedback impedance) electrically coupled between the nodes ni2 and na2, and a back stage 116 electrically coupled between the ports 44 and 52 for cancelling noise, e.g., noise induced by the amplifier 114. In an embodiment, the impedances PR1 and PR2 are matched programmable resistors to provide a same programmable feedback resistance between the output port 44 of the amplifier 114 and the input port 42 of the amplifier 114. Along with FIG. 5, please refer to FIG. 8 illustrating cooperation of the amplifier 50 and the matching circuit 110. As shown in FIG. 8, the trans-conductance cell Gm1 can include a transistor M1 (e.g., an n-channel metal-oxide-semiconductor transistor) having a gate, a drain and a source electrically coupled to a node ng1, a node nd2 and the voltage VSS respectively. Symmetrically, the trans-conductance cell Gm2 can include a transistor M2 (e.g., a matched duplicate of the transistor M1) having a gate, a drain and a source electrically coupled to a node ng2, a node nd1 and the voltage VSS, respectively. The nodes ng1 and ng2 are electrically coupled to the nodes ni1 and ni2 via the capacitors Ca1 and Ca2 of AC coupling, respectively. The nodes nd1 and nd2 are electrically coupled to the nodes nr1 and nr2, respectively. With the amplifier 114 and the feedback impedances PR1 and PR2 (FIG. 5), the matching circuit 110 provides programmable impedances respectively at the nodes ng1 and ng2. Hence, an impedance Zin (FIG. 8) looking into the terminal RXI can be controlled by trans-conductance of the amplifier 114, and feedback resistance of the resistors PR1 and PR2. That is, the resistance of the feedback resistors PR1 and PR2 (FIG. 5) along with trans-conductance of the amplifier 114 can define the input impedance Zin to the first order. By appropriate setting of the resistance and the trans-conductance, the impedance Zin looking into the terminal RXI can match a desired value, e.g., 50 Ohms.

Figure 9:
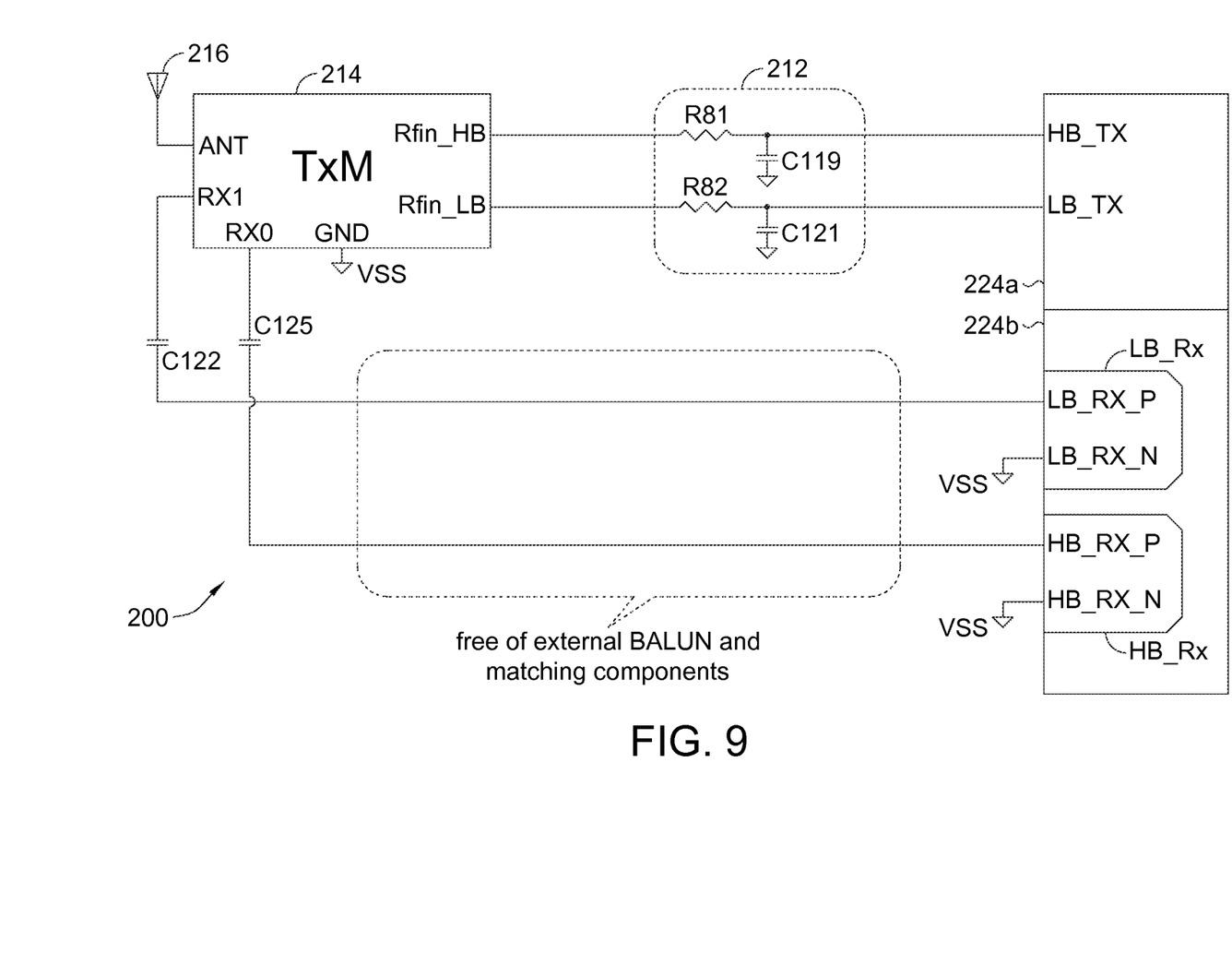
FIG. 9 illustrates an interface between antenna, transmitter and receiver according to an embodiment of the invention.

As demonstrated by FIG. 4 to FIG. 8, the resonator 40, the amplifier 50, the mixer circuit 60, the translation filter 70, the blocker detector 100 and the matching circuit 110 can cooperate to form a single-ended, SAW-less, general purpose (e.g., GSM/GPRS/EDGE compliant) mobile receiver circuit 120 (FIG. 4) with zero external components (e.g., BALUN and associated matching networks). Along with FIG. 4, please refer to FIG. 9 illustrating a wireless interface 200 for a wireless device according to an embodiment of the invention. The interface 200 bridges between an antenna 216, a transmitter 224a and a receiver 224b, and includes a TxM (a packaged IC) 214 and a network 212. The network 212 includes off-chip resistors R81 and R82, and capacitors C119 and C121. High-band RF signal and low-band RF signal to be transmitted via the antenna 216 are provided by the transmitter 224a respectively via terminals HB_TX and LB_TX, relayed to the terminals Rfin_HB and Rfin_LB of the TxM 214 via the network 212, and further relayed to the antenna 216 via a terminal ANT of the TxM 214.

For RF signal receiving, the receiver 224b includes two receiver circuits LB_Rx and HB_Rx respectively for low-band and high-band signal receiving. The receiver circuit LB_Rx has a receiver terminals LB_RX_P for receiving single-end low-band signal and a ground terminal LB_RX_N for electrically coupled to the voltage VSS; similarly, the receiver circuit HB_Rx has a receiver terminals HB_RX_P for receiving single-end high-band signal and a ground terminal HB_RX_N for electrically coupled to the voltage VSS. The receiver circuits LB_Rx and HB_Rx of the receiver 224b can be integrated into a same IC; the transmitter 224a and the receiver 224b can be integrated into the same IC.

The receiver circuit LB_Rx in FIG. 9 is implemented by the receiver circuit 120 shown in FIG. 4, wherein the terminals RXI and GND of the receiver circuit 120 serve as the terminals LB_RX_P and LB_RX_N of the receiver circuit LB_Rx, and the resonator 40, the amplifier 50, the matching circuit 110, the mixer circuit 60 and the translation filter 70 are configured for low-band. For example, the frequency fLO of the signal LO is for low-band, the notch of the resonator 40 is positioned at harmonic of low-band frequency, and the bandwidth of the pass band B1 (FIG. 5) is designed to reject blockers close to wanted low-band signal by plus and minus 20 MHz.

The receiver circuit HB_Rx in FIG. 9 is also implemented by the receiver circuit 120 shown in FIG. 4, wherein the terminals RXI and GND of the receiver circuit 120 serve as the terminals HB_RX_P and HB_RX_N of the receiver circuit HB_Rx, and the resonator 40, the amplifier 50, the matching circuit 110, the mixer circuit 60 and the translation filter 70 are configured for high-band. For example, the frequency fLO of the signal LO is for high-band, the notch of the resonator 40 is positioned at harmonic of high-band frequency, and the bandwidth of the pass band B1 (FIG. 5) is designed to reject blockers close to wanted high-band signal by plus and minus 80 MHz.

In contrast to the prior art interface 10 in FIG. 3, because the receiver circuits LB_Rx and HB_Rx in FIG. 9 both adopt architecture of the receiver circuit 120 of the invention, there is no need to deploy the ASM matching network 18, the external BALUN 20 and the receiver differential matching network 22 between the TxM 214 and the receiver 224b. As shown in FIG. 9, high-band wireless RF signal and low-band wireless RF signal received via the antenna 216 are respectively dispatched to the terminals RX0 and RX1 by the TxM 214, and directly relayed to the terminals HB_RX_P and LB_RX_P via the capacitors C125 and C122.

To sum up, the invention utilizes blocker detector and translation filter to reject close-in blockers, multi-mode embedded resonator for suppression of far-out blockers and conversion from single-end to differential, and embedded active matching circuit to work with LNA for on-chip impedance matching. Accordingly, the invention can provide an ultra low cost, general purpose (e.g., for GSM/EDGE mobile telecommunication), single-ended and broadly compliant (e.g., ETSI compliant) receiver platform which also eliminates requirement of external frontend components (e.g., inductors, resistors and capacitors for ASM matching network and receiver differential matching network) and therefore reduces demanded PCB area for high compactness, and minimizes BOM (bill of material) cost for the frontend components. The invention also provides a handy, flexible, highly reusable and "plug and play" solution which greatly reduces efforts on tweaking and fondling sensitive high-frequency PCB placement and routing, and can therefore be easily deployed to various kinds of wireless devices. On the contrary, prior art solutions require exhausted laboratory effort on matching and SAW filter tuning, as well as finding optimum matching of external component, since it is sensitive to PCB placement and routing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An integrated circuit for communication, comprising:
   a receiver terminal;
   a resonator electrically coupled between the receiver terminal and an internal port, capable of providing a conversion from single-end signal to differential signal, and capable of providing a filtering function;
   a main amplifier electrically coupled between the internal port and a high-frequency port, capable of amplifying a first signal at the internal port and accordingly providing a second signal at the high-frequency port;
   a blocker detector electrically coupled to the internal port, capable of detecting occurrence of blocker;
   a mixer circuit electrically coupled between the high-frequency port and a low-frequency port, capable of mixing the second signal with an oscillation signal; and
   a translation filter electrically coupled to the low-frequency port, capable of providing a first pass band at the low-frequency port;
   wherein the mixer circuit is further capable of translating the first pass band to a second pass band at the high-frequency port; the mixer circuit comprises a main mixer and an auxiliary mixer, and
   when blocker is not detected, the mixer circuit is further capable of operating in a normal mode to enable the main mixer and disable the auxiliary mixer, and
   when blocker is detected, the mixer circuit is further capable of operating in an OOB mode to enable both the main mixer and the auxiliary mixer.

2. The integrated circuit of claim 1, wherein the resonator comprises:
   a first coil comprising a first end and a second end, the first end being electrically coupled to the receiver terminal; and
   a second coil magnetically coupled to the first coil, comprising a third end and a forth end electrically coupled to two nodes of the internal port.

3. The integrated circuit of claim 2, wherein the resonator further comprises:
   a first cross capacitor connected between the first end and the third end.

4. The integrated circuit of claim 3, wherein the resonator further comprising:
   a second cross capacitor connected between the second end and the fourth end.

5. The integrated circuit of claim 3, wherein the first cross capacitor is programmable.

6. The integrated circuit of claim 1, wherein
   when blocker is not detected, the main amplifier is further capable of operating in the normal mode to amplify the first signal by a first gain, and
   when blocker is detected, the main amplifier is further capable of operating in the out-of-band (OOB) mode to amplify the first signal by a second gain which differs from the first gain.

7. The integrated circuit of claim 6, wherein the first gain is greater than the second gain.

8. The integrated circuit of claim 1 further comprising:
   a matching circuit electrically coupled to the internal port, capable of providing impedance for a first internal node of the internal port and a second internal node of the internal port.

9. The integrated circuit of claim 8, wherein the matching circuit comprises:
   an auxiliary amplifier electrically coupled between the internal port and an auxiliary port;
   a first feedback impedance electrically coupled between the first internal node and a first auxiliary node of the auxiliary port; and
   a second feedback impedance electrically coupled between the second internal node and a second auxiliary node of the auxiliary port.

10. The integrated circuit of claim 9, wherein the first feedback impedance is programmable.

11. The integrated circuit of claim 1, wherein the main amplifier comprises:
    a first trans-conductance cell electrically coupled between a first internal node of the internal port and a second high-frequency node of the high-frequency port; and
    a second trans-conductance cell electrically coupled between a second internal node of the internal port and a first high-frequency node of the high-frequency port.

12. The integrated circuit of claim 11, wherein the first trans-conductance cell comprises a first transistor having a gate and a drain electrically coupled to the first internal node and the first high-frequency node respectively.

13. The integrated circuit of claim 1, wherein the translation filter comprises:
    a filter capacitor electrically coupled between a first low-frequency node of the low-frequency port and a second low-frequency node of the low-frequency port;
    a first resistor electrically coupled between the first low-frequency node and a first filter node; and
    a second resistor electrically coupled between the second low-frequency node and a second filter node.

14. The integrated circuit of claim 13 further comprising:
    a low-pass filter electrically coupled to the first filter node and the second filter node.

15. The integrated circuit of claim 1, wherein frequency of the first pass band is lower than frequency of the second pass band.

16. The integrated circuit of claim 15, wherein the first pass band is a low-pass band.

17. The integrated circuit of claim 1, wherein the filtering function of the resonator is associated with a harmonic of the oscillation signal.

18. An integrated circuit for communication, comprising:
    a receiver terminal;
    a resonator electrically coupled between the receiver terminal and an internal port, capable of providing a conversion from single-end signal to differential signal, and capable of providing a filtering function;
a main amplifier electrically coupled between the internal port and a high-frequency port, capable of amplifying a first signal at the internal port and accordingly providing a second signal at the high-frequency port;
a matching circuit electrically coupled to the internal port, capable of providing impedance for a first internal node of the internal port and a second internal node of the internal port; the matching circuit comprising an auxiliary amplifier electrically coupled between the internal port and an auxiliary port, a first feedback impedance electrically coupled between the first internal node and a first auxiliary node of the auxiliary port, and a second feedback impedance electrically coupled between the second internal node and a second auxiliary node of the auxiliary port;
a mixer circuit electrically coupled between the high-frequency port and a low-frequency port, capable of mixing the second signal with an oscillation signal; and
a translation filter electrically coupled to the low-frequency port, capable of providing a first pass band at the low-frequency port;
wherein the mixer circuit is further capable of translating the first pass band to a second pass band at the high-frequency port.

* * * * *